3 Sheets--Sheet 2.

A. L. BOGART.

Improvement in Apparatus for Lighting Gas by Electricity.

No. 119,561. Patented Oct. 3, 1871.

Witnesses.
A. S. Merle
John R. Young

Inventor:
A. L. Bogart, by
Prindle and Dyer, his
Attys.

AM. PHOTO-LITHOGRAPHIC CO. N.Y. (OSBORNE'S PROCESS.)

3 Sheets--Sheet 3.
A. L. BOGART.
Improvement in Apparatus for Lighting Gas by Electricity.
No. 119,561. Patented Oct. 3, 1871.
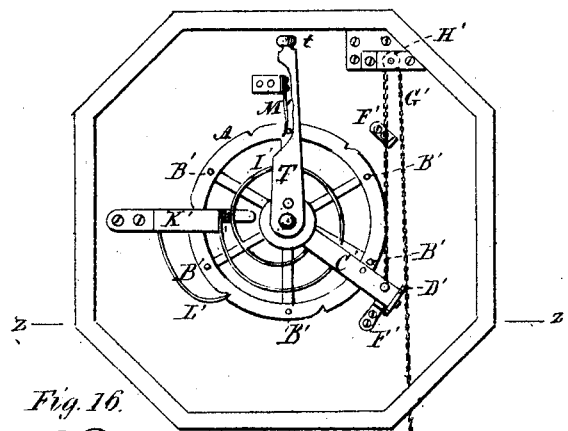
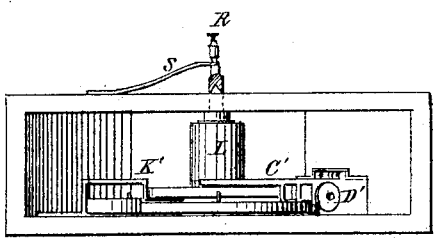
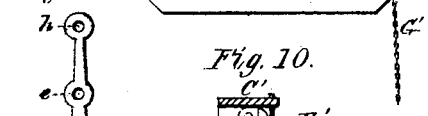
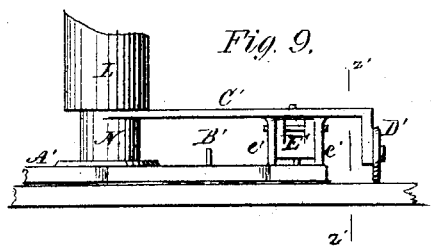
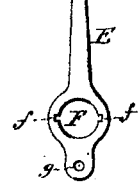
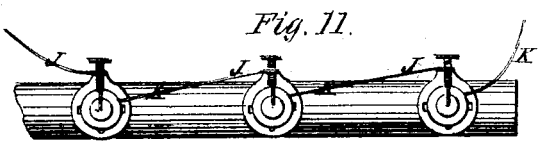
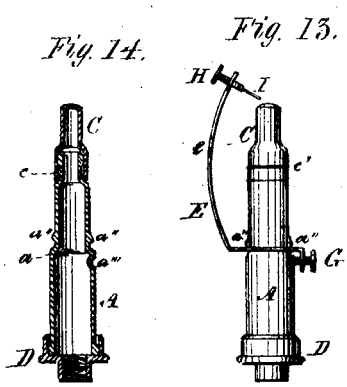
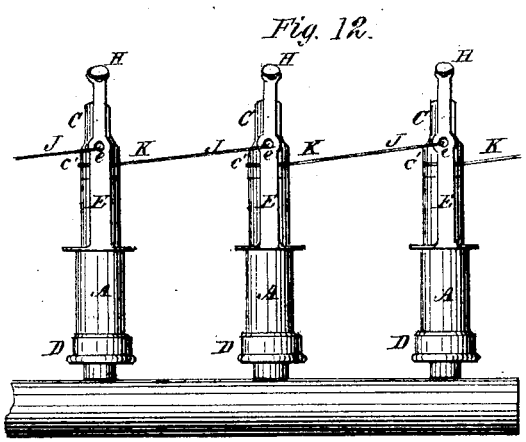
Witnesses.
Inventor
A. L. Bogart, by
Prindle and Dyer, his
Attys.

119,561

UNITED STATES PATENT OFFICE.

ABRAHAM L. BOGART, OF NEW YORK, N. Y.

IMPROVEMENT IN APPARATUS FOR LIGHTING GAS-JETS BY INDUCED CURRENTS OF ELECTRICITY.

Specification forming part of Letters Patent No. 119,561, dated October 3, 1871.

*To all whom it may concern:*

Be it known that I, ABRAHAM L. BOGART, of New York, in the county of New York and in the State of New York, have invented certain new and useful Improvements in Apparatus for Lighting Gas-Jets by Induced Currents of Electricity; and do hereby declare that the following is a full, clear, and exact description thereof, reference being had to the accompanying drawing making a part of this specification, in which—

Figure 1:
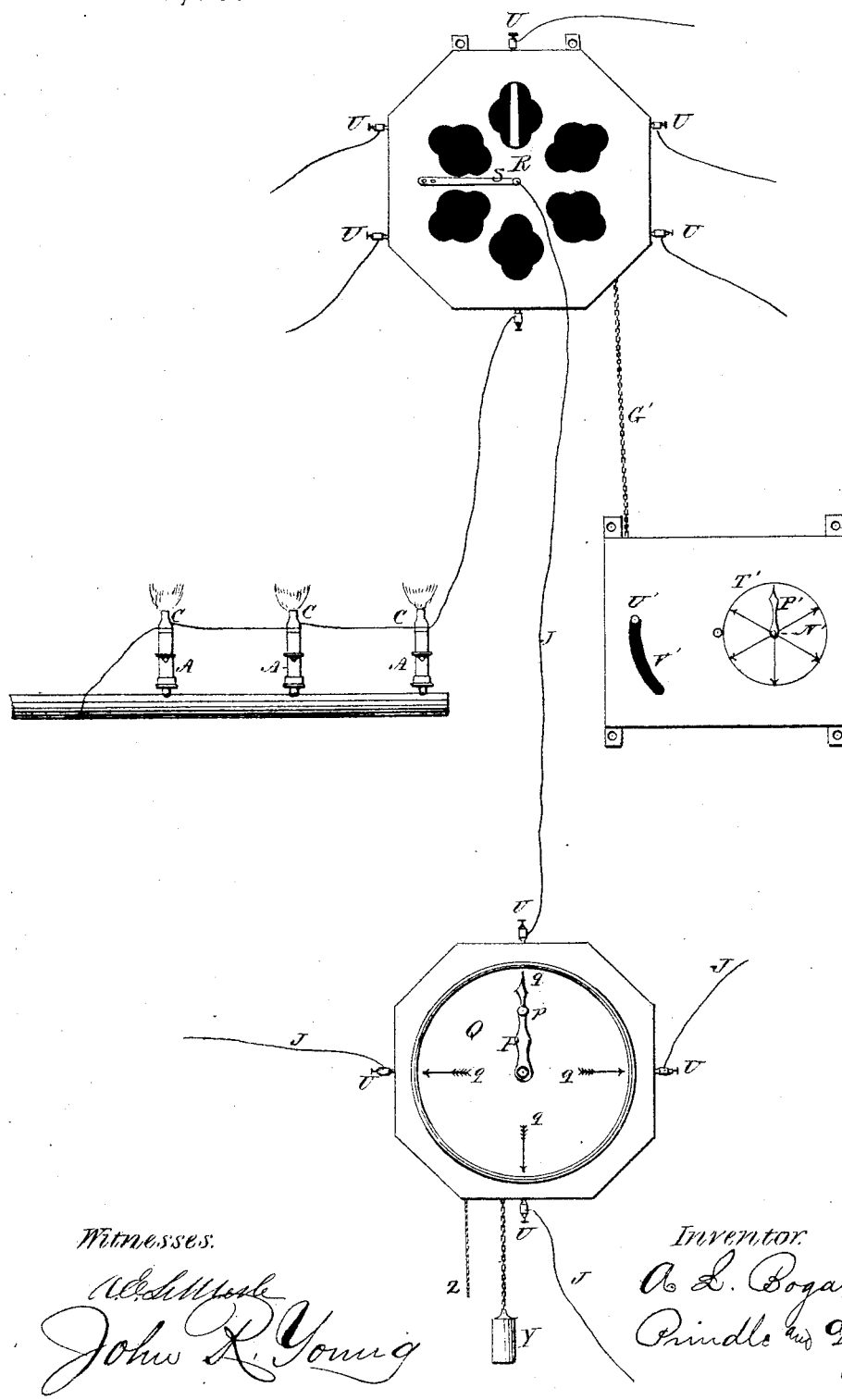
Figure 2:
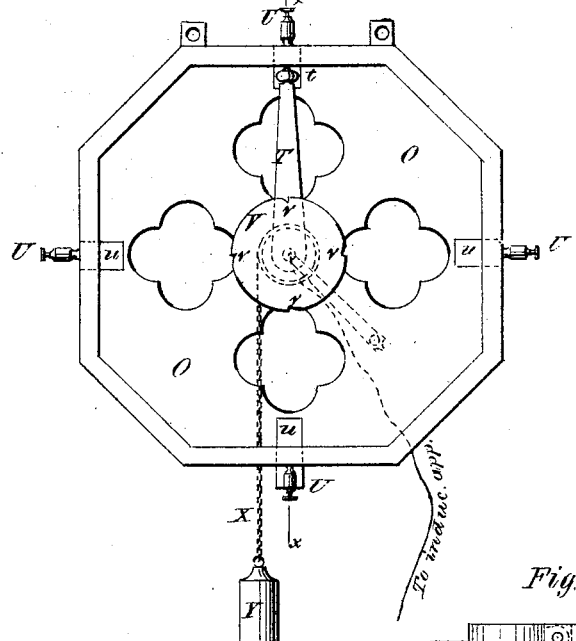
Figure 3:
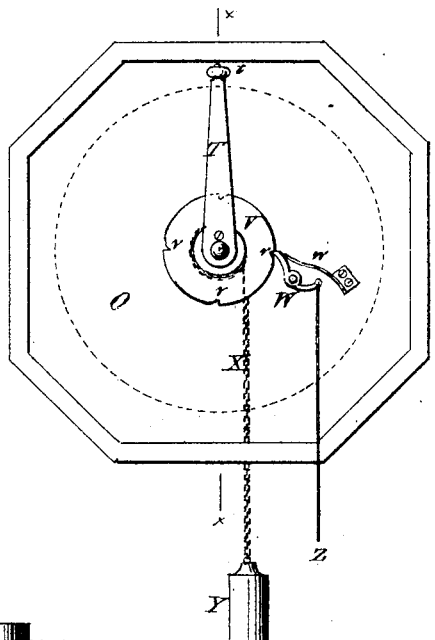
Figure 6:
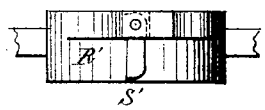
Figure 4:
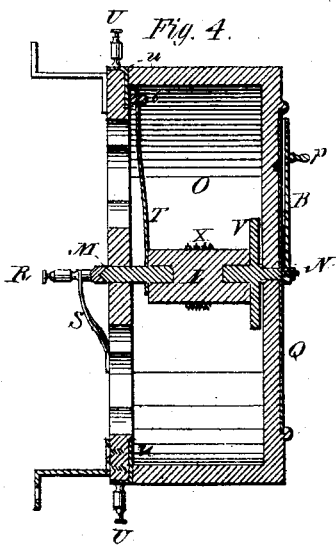
Figure 5:
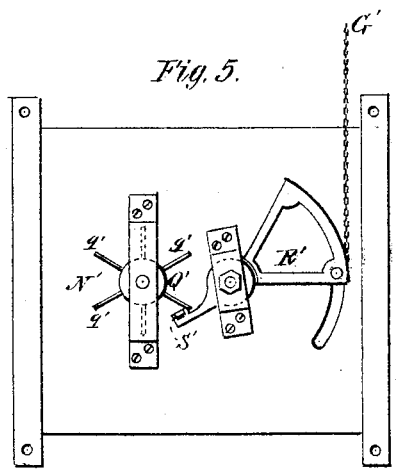

Figure 1 is a front elevation of my apparatus as in use, showing the relative positions of the various parts. Fig. 2 is a front elevation of the lower switch with its dial and pointer removed. Fig. 3 is a like view of the rear side of the same, with the back side of the casing removed. Fig. 4 is a vertical central section of said switch, on the line $x\ x$ of Figs. 2 and 3. Fig. 5 is a rear elevation of the indicator. Fig. 6 is an enlarged elevation of the front end of the operating lever and pivoted pawl of said indicator. Fig. 7 is a front elevation of the upper switch, the front side of its case being removed so as to show the interior of the same. Fig. 8 is a horizontal section of said switch on the line $z\ z$ of Fig. 7. Fig. 9 is an enlarged rear elevation of the lever and pawl for operating said switch. Fig. 10 is a vertical cross-section of said lever on the line $z'\ z'$ of Fig. 9. Fig. 11 is a plan view of the upper side of a series of my burners attached to one pipe. Fig. 12 is a front elevation of the same. Fig. 13 is a side elevation of one of said burners. Fig. 14 is a vertical central section of the same. Fig. 15 is a side elevation of one of the insulating sections of the burner. Fig. 16 is a plan view of the spark-conductor as cut from the plate, and before being bent to shape; and Fig. 17 is an enlarged view of one of the platinum-point holders, with a portion of one side broken away so as to show the method of attaching thereto said point.

Letters of like name and kind refer to like parts in each of the figures.

My invention is an improvement in apparatus for lighting gas-jets by induced currents of electricity; and it consists principally in the peculiar construction of the insulated burner, substantially as and for the purpose hereinafter specified. It consists, further, in the construction of the conductor, and in the means employed for securing the same to or upon the insulator of the burner, substantially as and for the purpose hereinafter shown. It consists, further, in the means employed for securing the platinum point to or within its holder, substantially as is hereinafter set forth. It consists, further, in the construction of the lower or primary switch, substantially as and for the purpose hereinafter shown and described. It consists, further, in the peculiar construction of the operating mechanism of the upper or secondary switch, substantially as and for the purpose hereinafter specified. It consists, further, in the construction of the indicator for controlling and recording the operations of the upper switch, substantially as and for the purpose hereinafter shown. It consists, finally, in the combination of the indicator and upper switch, substantially as and for the purpose hereinafter set forth.

In the annexed drawing, A represents the body of the burner, constructed from glass or other similar non-conducting material, capable of resisting the action of heat and cold, and having the form shown in Fig. 15, its upper portion being somewhat smaller than its lower portion so as to form a shoulder, $a$, at or near its longitudinal center. The upper end of the body A is still further reduced so as to form a neck, B, which corresponds to and receives the enlarged portion of a metal tip, C, which tip is secured thereon by means of cement, in the usual manner. In order that the tip may be more firmly united to the body a groove, $b$, is formed at the lower end of the neck B, and a similar groove, $c$, cut within the interior of said tip, within which grooves the cement will hold with such tenacity as to render the separation of said parts impracticable without breakage. The lower end of the body A is provided with a series of short grooves, $a'$, which extend around said end, and, when the same is cemented within the base D, prevents the vertical separation of said parts, and also any change in their relative radial positions. The spark conductor E is constructed of or from thin sheet metal, preferably spring brass; and when first stamped out has the form shown in Fig. 16, one end being enlarged and provided with an opening, F, which corresponds in size with the body A of the burner immediately above the shoulder $a$, while at the extreme opposite ends are suitable threaded openings, $g$ and $h$, for the reception, respectively, of a set-screw, G, and a screw-holder, H, for containing the platinum point I.

As thus constructed the conductor is given the desired form by bending the end containing the set-screw G downward at a right angle to the enlarged portion, and slightly curving the opposite portion of said conductor and turning the same upward so as to bring its end somewhat above the corresponding end of the burner, and within about half an inch of the same, in which position the platinum point I extends downward and inward at an angle of about thirty degrees, with its end about one-eighth of an inch above the gas openings.

In order that the conductor may be firmly attached to or upon the burner two small projections, $a'''$, are formed upon opposite sides of the body A, immediately above the encircling portion of said conductor, which projections insure the relative vertical positions of said parts, while their relative radial positions are insured by means of a conical depression, $a'''$, formed within the enlarged portion of said body in such position as to receive the conical end of the set-screw G. Two notches, $f$, cut within opposite sides of the opening F, and corresponding in size to the projections $a''$, permit the holder to pass over the latter when being attached to the body, after which said holder may be turned until the set-screw and its depression coincide, and then secured in place. An opening, $e$, provided within the conductor E near its upper end enables the induction-wire J to be attached to the same, while a groove, $c'$, cut within the periphery of the nipple C near its lower end permits the eduction-wire K to be connected thereto.

It will be seen that the burner-tip is not only insulated from the gas-pipe by the glass section, but, by the peculiar construction of the conductor and the means employed for connecting the same to or with said burner, said conductor and said tip are insulated from each other and can only be connected by design.

As thus constructed the burners are operated singly or combined, as shown in Figs. 11 and 12, but in either case the current of electricity passing from the induction-wire J upward along the conductor, being interrupted by the space between the platinum point I and the nipple, is broken, and produces a spark which instantly ignites the escaping gas. The threaded holder for the platinum point enables the latter to be adjusted toward or from the nipple, as occasion requires.

In order to insure the union between the platinum point I and its holder H, the latter is provided at its forward end with a central longitudinal opening that corresponds in size with said point and extends rearward to a transverse opening, $h$; as thus constructed the wire is inserted within the holder until its inner end projects within the opening $h$, when, by a slight blow upon a punch inserted within said opening, the end of said wire is bent downward so as to effectually prevent the withdrawal of the same. When more than one series of burners require lighting it becomes necessary that an appropriate switch should be employed, in order that the current of electricity may be directed to either, as may be desired.

The switch employed by me is shown in Figs. 2, 3, and 4, and is constructed as follows: A short cylindrical shaft, L, constructed of wood or other non-conducting material, is provided at its ends with suitable metal journals M and N, and journaled within a wooden case, O, having preferably the form shown. The ends of the journals project through the sides of the box, and upon one of them, N, is secured a pointer, P, while upon the corresponding face of the case is provided a suitable dial, Q, over or around which said pointer traverses. The opposite journal M is pointed and receives upon its outer end the correspondingly-recessed end of a conductor, R, which conductor is maintained in position and caused to press against said journal by means of a spring, S, secured at one end to said conductor and at its opposite end to the case. Attached to the journal M, immediately outside of the shaft L, is an arm, T, formed of spring sheet metal, which extends radially outward and is provided upon its outer end with a roller, $t$, which, when said shaft is rotated, bears against the inner face of the rear side of the case and forms a rolling bearing for said arm. Upon the inner face of the case, back, and at suitable points around the circle described by the roller, are secured metal plates $u$, which connect with ordinary holders U for receiving and containing the conducting-wires, while upon the dial Q are placed a like number of radial marks, $q$, which correspond in position to the position of said plates, and when the pointer P and arm T are properly adjusted cause said pointer to indicate upon said dial the precise position of said roller with relation to each plate.

If, now, the induction-wire be connected to or with the holder or conductor $R^2$ and wires extended from the holders U to the different series of burners, it will be seen that by rotating the shaft the arm and roller will be brought into contact with each holder and instantly open communication between its wire and the battery.

A knob, $p$, attached to the pointer P, enables the latter to be turned at will, but as it is necessary that, when moved to position, the arm should be held firmly in place, a ratchet-wheel, V, is secured upon the forward end of the shaft L, and provided with teeth $v$, which correspond in position and number to the number of conducting-wires connected with the switch. A pawl, W, is pivoted to the case upon one side of the ratchet-wheel, and has its upper end held in engagement with the teeth of the latter by means of a spring, $w$, which is also attached to said case. A chain or cord, X, provided at one end with a weight, Y, is attached to the shaft L so as to cause it to be wound thereon when said shaft and the ratchet-wheel are turned forward.

As thus arranged it will be seen that the weight Y counterbalances the weight of the arm and pointer and offers a sufficient resistance to their forward motion to prevent them from passing much beyond the desired point, while the action of the pawl is to instantly arrest the backward movement of said parts and lock them in the exact position desired.

When by a continued forward motion of the pointer and shaft the weight is wound up, or when it is desired to turn the mechanism backward, the pawl W may be released from engagement with its ratchet by pulling downward upon a cord, Z, attached to the outer lower end of the same and extending downward through the case.

In public buildings, halls, &c., it is frequently the case that many of the clusters or series of burners are placed at a considerable distance from and elevation above those upon the sides of the room or near the floor; and in order to avoid the running of the wires of each to the switch used for the lower burners it has been found advantageous to employ a second switch, placed at or nearly upon a level with said upper burners, and connected with the lower switch by a single wire. The electric apparatus of the upper switch is in all respects the counterpart of that hereinbefore described; but as from its elevated position it is impracticable to operate the same by the means employed for operating said lower switch the following-described devices are employed: Upon the journal N, immediately within the casing, is secured a wheel, A', having at equidistant points upon its forward face, near its outer edge, a series of studs, B', which correspond in number to the number of wires that are to be connected with the switch. Immediately outside of the wheel A' and upon the journal N is pivoted one end of a lever, C', the opposite or outer end of which extends laterally outward beyond the periphery of said wheel and is provided with a roller, D', having a sufficient size to cause it to bear upon the rear cover of the case and furnish a rolling bearing for said lever. Extending rearward from the lever C', and upon either side of the line of studs B', are two lugs, e', to which is hinged a pawl, E', which, while capable of swinging upward and forward, is prevented from passing below a horizontal line.

As thus constructed it will be seen that if the lever is moved upward its pawl will engage with one of the studs and move forward the wheel, while upon the return motion of said lever said pawl will pass freely over said studs, so that it is only necessary to confine the movement of said lever within certain limits and provide means for operating the same to enable the shaft and connecting devices to be operated.

Two lugs, F', secured upon the case, limit and define the movement of the lever, while a chain or cord, G', attached to its outer end, and from thence passing upward around a pulley, H', and thence downward through said case, enables said lever to be moved at will. A coiled spring, I', secured to the inner end of the lever and to a suitable brace, K', returns the former to the position shown in Fig. 7, whenever released. The wheel A' is prevented from revolving backward by means of a spring-pawl, L', attached to the case and engaging with suitable teeth cut in the periphery of said wheel, while the forward motion of the latter is arrested at the points of engagement of said pawl by means of a spring, M', which is attached to said case and bears against the stud that happens to be uppermost.

The switch thus constructed is connected with the lower switch by a single wire, and can be readily operated from below; but in order that the position of its arm F may at all times be known with certainty the device hereinafter described is employed.

A short shaft, N', is journaled horizontally within a suitable casing, and provided upon its outer end with a pointer, P', and upon its inner end, immediately within the face of said case, with a sprocket-wheel, Q'. A lever, R', having the form shown in Fig. 5, is pivoted at one side of the shaft N', upon the casing, in such a position as to bring its shorter end over the outer ends of the spokes q' of the sprocket-wheel, and said end is provided with a pawl, S', which is so hinged thereto as to swing upward and rearward, but which will not pass below a horizontal line. If, now, the lever be moved up and down, its pawl will alternately engage with and pass over the spokes q', so as to move the wheel and its attachments forward in one direction, but with an intermittent motion.

The spokes of the wheel Q' correspond in number with the studs B' of the wheel A', and immediately beneath the pointer P' is placed a dial T', upon which are recorded the names of the tiers or series of burners in the same relative positions as are arranged their connections at the upper switch. The outer end of the lever R' is grooved so as to contain the end of the chain G', which is attached to its lower side, while said lever is operated by means of a stud, U', that projects from its outer end outward through a slot, V', in the casing, the length of said slot being just sufficient to enable said lever to rotate the sprocket-wheel one spoke. The indicator thus constructed is placed in a suitable position near the lower switch, and being connected with the upper switch by means of the operating-chain of the latter, the mechanism of said switch is caused to move simultaneously with that of said indicator and the switch-arm and the pointer caused to coincide in relative radial position. The apparatus is now complete and its several parts are arranged substantially as shown in Fig. 1, the lower switch and indicator being placed near the induction apparatus, while the upper switch is placed near the upper tiers of burners and connected with said indicator and lower switch, as described. The eduction-wire from each series of burners may be carried directly from the last of the series to the induction apparatus, or it may be connected with the gas-pipe below said burner and said apparatus connected with the lower end of said pipe, as may prove most convenient.

The special advantages possessed by my apparatus are: First, the burner is not only insulated most perfectly when new, but from the imperishable nature of the insulating section is never affected by heat or other causes that destroy rubber insulators, and is as durable as though constructed entirely of metal; in addition to which the construction of the different sections of said burner enables them to be united so firmly as to prevent separation without breakage, and also to produce perfect gas-tight joints. Second, the cost of the insulated burner is materially reduced by the use of the glass section, which, from its peculiar construction, can be produced readily and at a trifling expense. Third, the spark-conductor, formed in one piece from spring-metal, is more durable, less liable to derangement, and costs much less than any heretofore used, while the method of its attachment to the burner is more simple and effective than any ordinarily employed. Fourth, the platinum point is so thoroughly fixed within its holder as to render its accidental separation therefrom impossible without breakage, while, from the construction of said holder and its combination with the conductor and burner-tip, the relative positions of the parts can be most easily secured. Fifth, the groove formed within the burner-tip for the reception of the eduction-wire is simple, inexpensive, and enables said parts to be so firmly connected as to render their accidental disconnection impracticable. Sixth, the operating mechanism of the switches and indicator are simple, certain in operation, and comparatively inexpensive. Seventh, the combination of the switches and indicator enables any desired number of burners or series of burners to be lighted by means of a comparatively small and inexpensive induction apparatus, and also enables series of burners widely separated from each other and from the position of the operator to be lighted without the use of long intermediate conducting-wires, which are liable to derangement and difficult to properly insulate and keep in order.

Having thus fully set forth the nature and merits of my invention, what I claim as new is—

1. An insulated gas-burner, having its insulating section constructed of or from glass or similar vitreous material, substantially as and for the purpose specified.

2. The glass section A, provided with the neck B and with the grooves $b$ and $a'$, and combined with the metal tip C and base D, substantially as and for the purpose shown.

3. The spark-conductor E, having the form shown, and provided with the openings F, $g$, $h$, and $e$, substantially as and for the purpose set forth.

4. The spark-conductor E, provided within the opening F with the notches $f$, and within the opening $g$ with the set-screw G, in combination with the insulating section A, provided with the shoulder $a$, projections $a''$, and conical depression $a'''$, substantially as and for the purpose shown and described.

5. In combination with the spark-conductor E, constructed as described, and provided with the opening $h$, the platinum-point holder H, substantially as and for the purpose specified.

6. The burner-tip C, provided with the groove $c'$, in combination with the eduction-wire J, substantially as and for the purpose shown.

7. The platinum-point I and holder H, when combined and secured together, substantially as and for the purpose set forth.

8. The lower switch, consisting of the shaft L provided with the journals M and N, the pointer P, the conductor R, attached to or upon the spring S, the arm T provided with the roller $t$, the wire-holders U, and plates $u$, the ratchet-wheel V, the pawl W, the chain X, and the weight Y, when the several parts are constructed as described and combined with each other, the case O, and the dial Q, substantially as and for the purpose specified.

9. The upper switch, consisting of the shaft L provided with the journals M and N, the conductor R attached to or upon the spring S, the arm T provided with the roller $t$, the wire-holders U, and plates $u$, the wheel A' provided with the studs B', the pivoted lever C' provided with the roller D', lugs $e'$, and pivoted pawl E', the stops F', the chain G', the coiled spring I', and the detent M', when the several parts are constructed as shown and combined with each other and with the case O, substantially as and for the purpose set forth.

10. The indicator, consisting of the shaft N' provided with the pointer P' and sprocket-wheel Q', the lever R' provided with the hinged pawl S' and with the stud U', when the several parts are constructed as described and combined with each other, the dial T', and the case O' provided with the slot V', substantially as and for the purpose shown.

11. The combination of the upper switch and indicator, substantially as and for the purpose specified.

In testimony that I claim the foregoing I have hereunto set my hand this 9th day of September, 1871.

A. L. BOGART.

Witnesses:
GEO. S. PRINDLE,
EDM. F. BROWN.